(12) United States Patent
Haraqia et al.

(10) Patent No.: US 8,850,782 B2
(45) Date of Patent: *Oct. 7, 2014

(54) LAWNMOWER SAFETY

(75) Inventors: Agron Haraqia, Auckland (NZ); David McKay, Auckland (NZ); Gordon Boswell, Auckland (NZ)

(73) Assignee: Masport Limited, Auckland (NZ)

( * ) Notice: Subject to any disclaimer, the term of this patent is extended or adjusted under 35 U.S.C. 154(b) by 186 days.

This patent is subject to a terminal disclaimer.

(21) Appl. No.: 13/515,556

(22) PCT Filed: Dec. 14, 2011

(86) PCT No.: PCT/IB2011/055652
§ 371 (c)(1),
(2), (4) Date: Jun. 13, 2012

(87) PCT Pub. No.: WO2012/080956
PCT Pub. Date: Jun. 21, 2012

(65) Prior Publication Data
US 2012/0260619 A1 Oct. 18, 2012

(30) Foreign Application Priority Data

Dec. 14, 2010 (NZ) .................................. 589942
Dec. 24, 2010 (NZ) .................................. 590235

(51) Int. Cl.
*A01D 34/00* (2006.01)
*A01D 34/82* (2006.01)
*A01D 43/063* (2006.01)
*A01D 42/00* (2006.01)
*A01D 75/20* (2006.01)

(52) U.S. Cl.
CPC .............. *A01D 42/00* (2013.01); *A01D 34/828* (2013.01); *A01D 43/063* (2013.01); *A01D 75/20* (2013.01)
USPC ........................................................ 56/16.9

(58) Field of Classification Search
USPC ......... 56/16.4, 16.7, 16.9, 320.1, 320.2, 13.4, 56/11.3, 13.6, 13.8, 17.5; 241/55, 73, 241/82.3, 101.1, 101.74, 101.75, 101.71, 241/101.78
See application file for complete search history.

(56) References Cited

U.S. PATENT DOCUMENTS 3,808,782 A 5/1974 McWilliams
4,057,952 A 11/1977 Brokaw
(Continued)

FOREIGN PATENT DOCUMENTS

DE 3104501 8/1982

OTHER PUBLICATIONS

Brochure on Masport series 19 MSV 550 self-propelled lawnmower, 1 page.
Brochure on Masport series 19 MSV 3'N'1 Combo lawnmower, 1 page.

(Continued)

*Primary Examiner* — Robert Pezzuto
(74) *Attorney, Agent, or Firm* — Jacobson Holman, PLLC.

(57) ABSTRACT

The invention relates to safety improvements for mowers incorporating a chipper, and/or catcher. In one aspect the invention provides safety improvements that only allow operation of the chipper when the mower is below a predetermined threshold ride height. In another aspect, the mower includes one or more side skirts to prevent body parts from entering the cutting zone under the mower. In a still further aspect, the mower has a rear flap including a sub-flap. The mower is arranged so that the sub flap remains closed when a catcher is installed.

20 Claims, 11 Drawing Sheets

(56) References Cited

U.S. PATENT DOCUMENTS

| | | | |
|---|---|---|---|
| 4,172,351 A | 10/1979 | Scanland | |
| 4,411,125 A | 10/1983 | Strickland | |
| 5,305,587 A | 4/1994 | Johnson | |
| 5,381,970 A * | 1/1995 | Bold et al. | 241/55 |
| 5,408,815 A * | 4/1995 | Forte | 56/17.5 |
| 5,537,807 A * | 7/1996 | Gearing et al. | 56/11.3 |
| 5,626,008 A * | 5/1997 | Puszkar | 56/17.5 |
| 6,928,799 B2 * | 8/2005 | Nwosu et al. | 56/16.4 D |
| 2003/0217541 A1 | 11/2003 | Osborne | |
| 2011/0239609 A1 | 10/2011 | McKay | |

OTHER PUBLICATIONS

Brochure on Masport Genius 4n1 lawnmower, 8 pages.

* cited by examiner

LAWNMOWER SAFETY

This is a national stage of PCT/IB11/055,652 filed Dec. 14, 2011 and published in English, which claims the priority of New Zealand number 589942 filed Dec. 14, 2010, and New Zealand number 590235 filed Dec. 24, 2010, hereby incorporated by reference.

BACKGROUND TO THE INVENTION

1. Field of the Invention

The present invention relates to walk-behind lawnmowers for cutting grass. In particular the invention relates to safety improvements for mowers incorporating a shredder or chipper, and/or catcher.

2. Summary of the Prior Art

Push-behind or walk-behind lawnmowers with a powered cutting mechanism are well-known. Mowers of this type normally include a generally centrally located deck or housing that has an integral side wall which runs around the perimeter of a generally horizontally oriented deck or housing, and which is aligned substantially vertically running downwards towards the ground. The mower also has a powered cutting mechanism such as a pair of rotating blades, or a plurality of blades, located under the deck and inside the integral side wall. Items such as the engine or power source for the blades are generally located above the deck, attached to the top of the deck. The area bounded by the deck and side wall generally forms a cutting area under the mower.

Mowers usually also include a clippings catcher which catches cut grass clippings. This is normally located at the rear of the mower, attached to the rear of the deck or housing.

While so-called hover mowers are known, such as those produced by 'Flymo', most mowers also include wheels, usually located at the four corners of the deck.

Generally, there are two main ways in which mowers can be powered—electrically or by a petrol motor. Electric mowers are usually powered by an electrical cable connected between the mower and a mains outlet. Electric mowers can also be powered by a battery mounted on the machine. Petrol powered mowers are generally known as motor mowers, with the motor included as part of the mower so the mower is self-contained or self-sufficient.

It is common for the cutting mechanism to be formed as a disc that includes at least a pair of cutting blades, aligned at 180 degrees to one another to rotate around a central point, the tips of the blades forming a cutting circle or cutting disc as they rotate. Other types of blade mounting arrangements are also employed, such as the so-called bar blade where both ends of a single bar are sharpened to form cutting edges. The power for the cutting mechanism is provided from a power source. The power source is generally located on top of the deck (e.g. the motor), and a drive shaft extends downwards through the deck to power the cutting blades. For 'push' type or user-propelled mowers of either the electric or motor mower type, a user is required to push the mower in order to move it in the direction in which they wish to proceed—the power source does not provide movement power for the mower as a whole, just the cutting mechanism.

However, for some mowers, such as the 'Masport® series 19 MSV 550 self-propelled', power is also drawn from the motor in order to propel the mower forwards, a user controlling the movement direction of the mower by exerting sideways pressure on the handle, and the speed of both the mower and (if required) the blades by way of controls on the mower handle. Mowers of this type are generally known as self-propelled mowers.

As the mower moves forward, the tips of the blades contact the grass and cut it. The motion of the blades flings the grass clippings around the inside of the mower cutting area under the deck and towards the rear of the mower in a slingshot effect. The Masport® series 19 mowers are designed to take advantage of this effect, by having a deck with an overall volute shape, with one side of the deck formed as an expanding funnel. The motion of the blades causes the grass clippings and the surrounding air to be channelled along this funnel and out of the rear of the mower. In order to maximise this effect and to increase efficiency it is important that this channel is smooth and that there are no internal impediments which might disrupt the air flow or prevent the grass clippings from being thrown to the rear of the mower.

As well as cutting grass, some types of mowers may also be adapted to dispose of heavier garden waste or garden refuse such as a small branches or similar. This is useful where a user may not require a dedicated static chipper/shredder unit such as are known in the industry, but where the user may encounter circumstances or situations where as well as cutting the grass, they need to quickly and easily deal with or dispose of other, heavier types of garden refuse such as small windfall branches or similar. It is known to incorporate a small chipper or shredder into push mowers so that a user can achieve this. An example of a push mower that incorporates a chipper/shredder would be the 'Masport® series 19 MSV 3'N'1 Combo'. This is a user-propelled or 'push' type mower that includes a chipper shredder. A chipper tube is located on the top of the housing, aligned upwards and angled slightly backwards towards the mower handle. If a user needs to dispose of garden refuse such as small branches or similar, these are dropped or pushed into the top of the tube, passing down the tube into the cutting area under the housing and side wall. The 'Masport® series 19 MSV 3'N'1 Combo' includes a second, heavier, bar blade located above the grass cutting blade, with both cutting systems powered by a single drive shaft directly connected to the motor which is located on top of the housing, so that the grass cutting blades and the chipping blades rotate around a single axis. Refuse passing down the tube and entering the cutting area will contact the heavier chipping blades first. This refuse is chipped or shredded by the upper cutting blade or blades, and the resulting chips are disposed of in the same manner as the grass clippings produced by the lower grass cutting blade are disposed of.

In the 'Masport® series 19 MSV 3'N'1 Combo, clippings are disposed of by being flung or thrown by the cutting blades around the outside perimeter of the cutting space in a centrifugal manner in a similar manner to the way grass clippings are disposed of as outlined above. In order to aid in this disposal and centrifugal style throwing of clippings, the interior space under the deck and side wall (the cutting area) is volute-shaped in the Masport® Series 19 mowers. The mower deck includes an exit aperture at the rear to which a catcher can be connected in use. The chippings and grass clippings are flung around the outside perimeter of the cutting space and through this aperture. With a catcher connected to the rear of the mower, the chippings and grass clippings are collected in the catcher.

For mowers which include a chipper/shredder, where both the grass cutting blades and the chipper blades are arranged to rotate about a single axis, it is highly desirable that the deck is configured in such a manner that the rotation of the blades will sweep grass clippings and chippings around the cutting space and then into a collector, grass catcher or similar. In the Masport® Series 19 mowers, this is achieved by shaping the deck as a volute, as noted above, with an exit aperture extending across the rear of the mower. The clippings and chippings are swept in a circular motion around the volute and then flung backwards (and possibly slightly sideways across the mower from one side to the other), through the exit aperture and then (usually but not necessarily) into a collector at the rear.

Push type mowers that include a chipper/shredder for the disposal of heavier garden waste such as small windfall branches are known, as outlined above. The chipper/shredder blades on these combination mowers tend to be heavier than mower blades, and it is important that as far as practical, users are protected and prevented from being able to place themselves in a position of danger.

In general, the height of the mower above the ground (the 'ride height' or 'cutting height') can be adjusted. This is usually achieved by adjusting the deck and associated elements (i.e. the engine and the blades) relative to the wheels. This usually means that the size of the gap between the lower edge of the side wall and the ground changes.

It is also desirable in mowers to create 'rake'. That is, a change in the size of the gap between the front and the rear— e.g. a gap of 10 mm between the ground and the lower edge at the front of the mower and a gap of 20 mm at the rear. This allows air to circulate more freely and improves efficiency.

The present application claims priority from two New Zealand provisional applications being: NZ 589942 and NZ590235. Both these specifications are hereby incorporated into the present application by way of reference in their entirety.

U.S. Pat. No. 4,172,351 describes a mower which has a detachable side shield. The purpose of the side shield is to prevent the ejection of items that might cause harm or damage from the interior cutting space under the mower.

U.S. Pat. No. 4,411,125 describes a mower that has a skirt attached to the sidewall. It is stated that the purpose of the skirt is to prevent debris from being thrown from the housing.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the present invention to provide a mower and shredder/chipper combination that goes some way towards overcoming the disadvantages of the prior art such as are found with the devices described above, or which at least provides users with a useful choice.

According to one aspect the invention comprises a lawn mower with an integral chipper or shredder, comprising:
  a deck, forming a platform and having an exit aperture at the rear of the deck,
  a side wall arranged around at least part of the perimeter of the deck, the deck and the side wall enclosing a cutting space under the deck,
  a front wheel set and a rear wheel set located at the front and the rear of the deck respectively,
  a motor attached to the outside top of the platform of the deck, having a drive shaft extending downwards through the deck, the lower part of the drive shaft located substantially at the centre of the cutting space,
  at least one grass cutting blade or blades, and at least one chipper or shredder blade or blades, connected to the drive shaft within the cutting space so that the drive shaft causes the at least one grass cutting blade to rotate in a substantially horizontal grass cutting plane and the at least one chipper blade to rotate in a substantially horizontal chipping plane,
  a chipper tube having an upper end and a lower end, the lower end opening into the cutting space above and within the perimeter of the cutting disc formed by rotation of the at least one chipper blade in use, the chipper tube having a lid which is normally closed when the mower is operating, the lid fitted with a cut-off mechanism so that if the lid is opened when the ride height or cutting height of the mower has been adjusted to above a predetermined threshold height, the cut-off mechanism will stop the mower engine.

According to a further aspect the predetermined threshold ride height is the lowest ride height setting.

According to a further aspect the cut-off mechanism is a wire connected between the chipper tube lid and the mower engine,
  the lawnmower, chipper tube lid, and cut-off wire all dimensioned and adjusted so that the lawnmower engine will run without interruption when the lid is closed, but the wire will be pulled beyond the engine cut-off point and stop the engine when the lid is opened if the mower is adjusted to any point above a predetermined ride height.

According to a further aspect the lawnmower is fitted with a pair of microswitches, the first microswitch connected to the lid of the chipper tube, and arranged to be open when the lid is closed,
  a second microswitch located and arranged such that it is open when the mower is below a predetermined threshold ride height,
  such that the lawnmower engine will be stopped from running when the lid is opened, and the mower is above said a predetermined threshold ride height.

According to a further aspect the engine is stopped by grounding the primary winding of the ignition coil.

According to a further aspect the integral lid is spring-loaded and biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

According to a further aspect the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

According to a further aspect the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a safety clip, adapted so that at least the sub-flap cannot be raised any higher than the normal operating position that the flap and sub-flap would be in when a grass catcher were attached.

According to a further aspect the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

According to a further aspect the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

According to a further aspect the location of the connection points and the dimensions of the wire are chosen so that the spring is only just in tension when the flap and sub-flap are raised into the same or a similar position to that which they would be in with a grass catcher attached.

According to a further aspect at least the first end of the wire is formed as an eyelet.

According to a further aspect the wire is formed so that that part of the wire formed as a spring can move and pivot freely relative to the remainder of the wire when not in tension.

According to a further aspect that part of the wire formed as a spring is uppermost when the grass catcher is connected.

According to another aspect the invention comprises a lawn mower with an integral chipper or shredder, comprising:
  a deck, forming a platform and having an exit aperture at the rear of the deck,
  a side wall arranged around at least part of the perimeter of the deck, the deck and the side wall enclosing a cutting space under the deck,
  a front wheel set and a rear wheel set located at the front and the rear of the deck respectively,
  a motor attached to the outside top of the platform of the deck, having a drive shaft extending downwards through the deck, the lower part of the drive shaft located substantially at the centre of the cutting space,
  at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane,
  a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

According to a further aspect the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

According to a further aspect the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

According to a further aspect the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

According to a further aspect the location of the connection points and the dimensions of the wire are chosen so that the spring is only just in tension when the flap and sub-flap are raised into the same or a similar position to that which they would be in with a grass catcher attached.

According to a further aspect at least the first end of the wire is formed as an eyelet.

According to a further aspect the wire is formed so that that part of the wire formed as a spring can move and pivot freely relative to the remainder of the wire when not in tension.

According to a further aspect that part of the wire formed as a spring is uppermost when the grass catcher is connected.

According to another aspect the invention comprises a lawn mower, comprising:
  a deck, forming a platform and having an exit aperture at the rear of the deck,
  a side wall arranged around at least part of the perimeter of the deck, the deck and the side wall enclosing a cutting space under the deck,
  a front wheel set and a rear wheel set located at the front and the rear of the deck respectively,
  a motor attached to the outside top of the platform of the deck, having a drive shaft extending downwards through the deck, the lower part of the drive shaft located substantially at the centre of the cutting space,
  at least one grass cutting blade or blades, connected to the drive shaft within the cutting space so that the drive shaft causes the at least one grass cutting blade to rotate in a substantially horizontal grass cutting plane,
  a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

According to a further aspect the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

According to a further aspect the location of the connection points and the dimensions of the wire are chosen so that the spring is only just in tension when the flap and sub-flap are raised into the same or a similar position to that which they would be in with a grass catcher attached.

According to a further aspect at least the first end of the wire is formed as an eyebolt.

According to a further aspect the wire is formed so that that part of the wire formed as a spring can move and pivot freely relative to the remainder of the wire when not in tension.

According to a further aspect that part of the wire formed as a spring is uppermost when the grass catcher is connected.

According to a further aspect the lawnmower also has at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane, and a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

According to a further aspect the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

According to another aspect the invention comprises a lawn mower with an integral chipper or shredder, comprising:
a deck,
a front wheel set and a rear wheel set located at the front and the rear of the deck respectively,
a motor attached to the outside top of the platform of the deck, having a drive shaft extending downwards through the deck, the lower part of the drive shaft located substantially at the centre of the cutting space, at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane, a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to a ride height setting above a predetermined threshold, to lock the lid in a closed position.

According to a further aspect the catch allows the lid to lock closed with the mower in any ride height position when the lid is moved from an open position to a closed position.

The term "comprising" as used in this specification means "consisting at least in part of". Related terms such as "comprise" and "comprised" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

A preferred form of the present invention will now be described with reference to the accompanying drawings in which.

DETAILED DESCRIPTION OF THE PREFERRED EMBODIMENTS

The present invention provides improvements to a lawn-mower which also includes a chipper or shredder.

Figure 1:
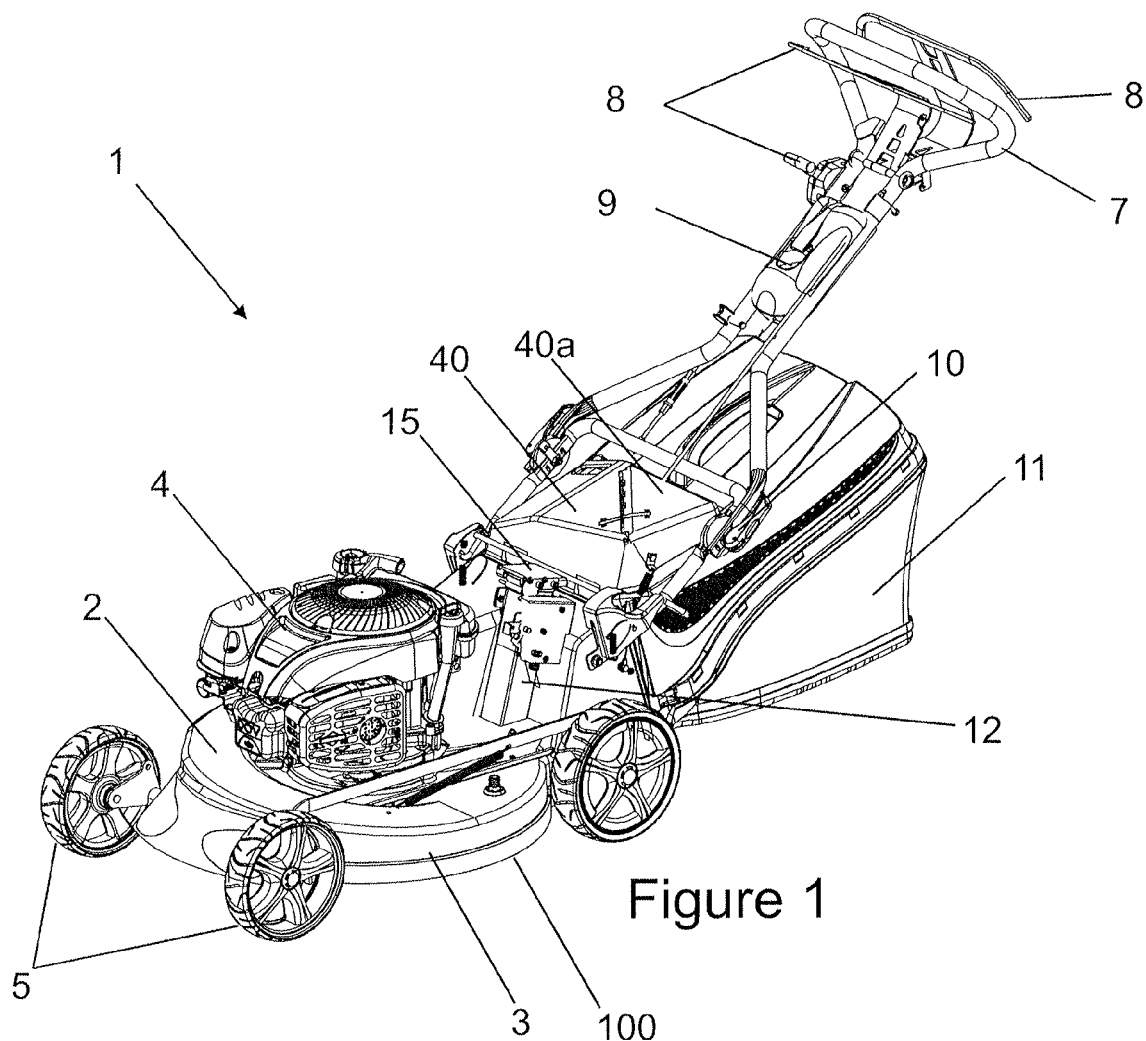
FIG. 1 shows a perspective view of one preferred embodiment of a mower.
Figure 2:
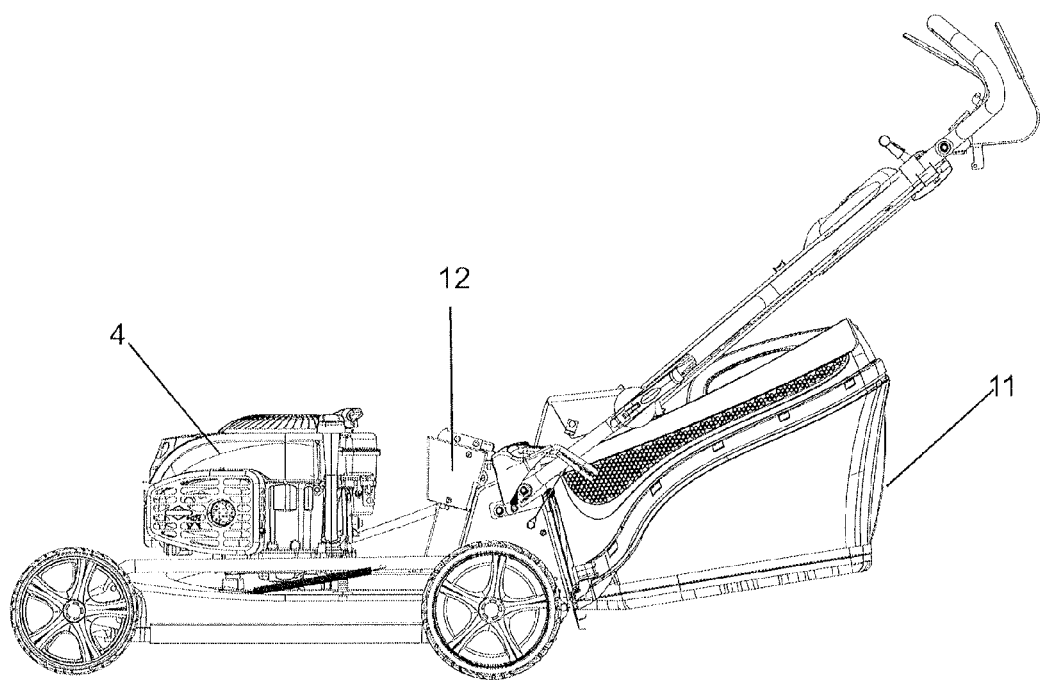
FIG. 2 shows a left hand side view of the mower of FIG. 1.
Figure 3:
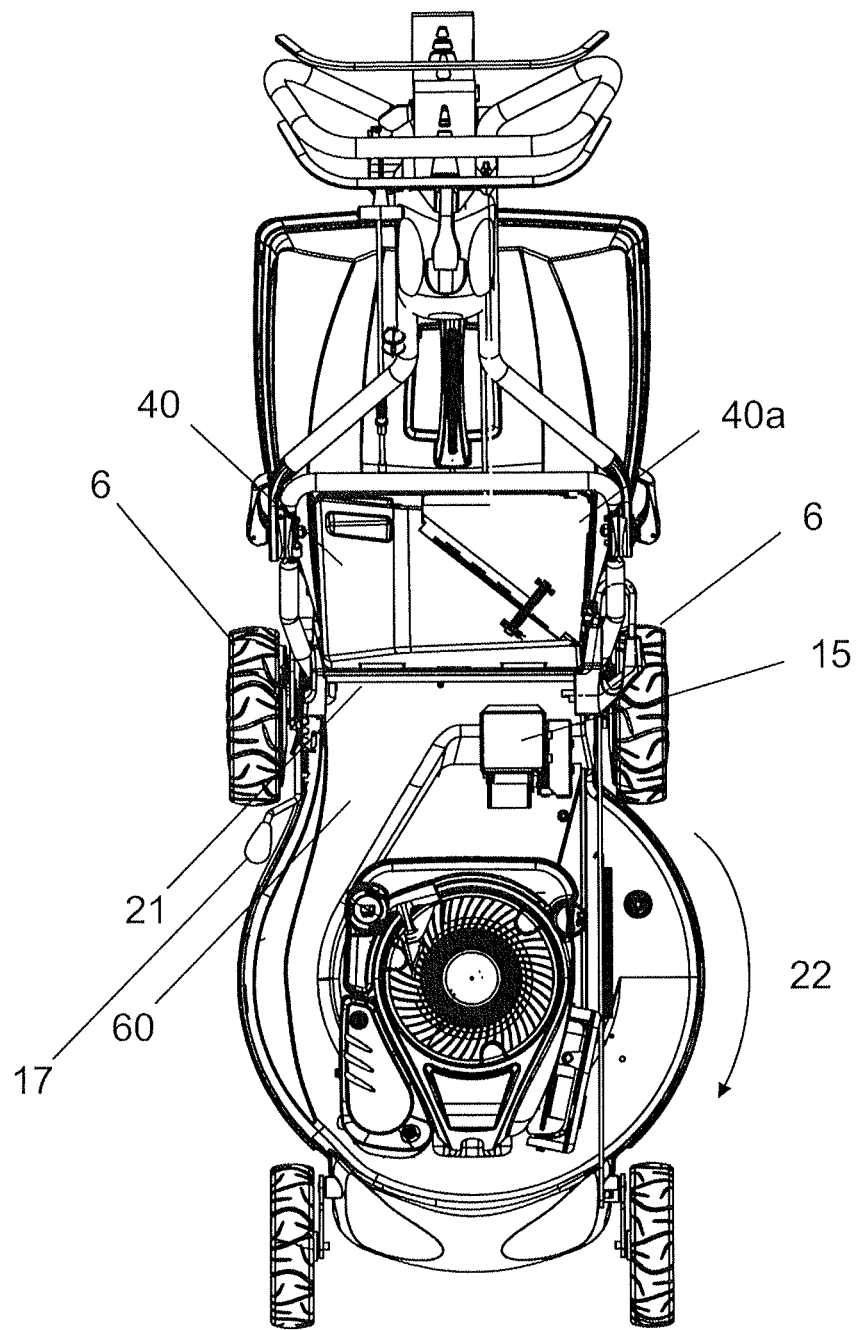
FIG. 3 shows a top view of the mower as shown in FIGS. 1 and 2.

A mower 1 according to one preferred form of the invention is shown in FIGS. 1, 2 and 3. The main part of the mower is a deck 2 which is generally shaped to have the overall form of a volute, the deck including an expanding funnel 60 which forms part of the volute and which runs along the right hand side of the deck, expanding towards the rear of the mower. The rear of the mower deck 2 at least partly forms an exit or exit aperture for the funnel 60. The mower also has an integral side wall 3 which is arranged around or runs around at least part of the outer perimeter of the deck 2. The deck 2 and the side wall 3 enclosing a cutting area or cutting space 70 in use, under the deck 2 and inside the perimeter of the side wall 3. A motor 4 is attached to the mower 1, on the outside top of the deck 2, approximately at the centre of the deck 2. In the preferred form, the motor 4 is petrol powered. However, it should be noted that any form of self contained motor could be used.

Alternatively, other forms could use a motor that relies on an external power supply, for example an electric motor which connects to a mains source, or even an electric motor powered by a battery carried on the mower. However, these are not preferred forms.

A pair of front wheels 5 and a pair of rear wheels 6 are located at the front and rear corners of the deck 2 respectively. However, a single front wheel could be used instead of a pair. Also a single rear wheel could be used instead of a pair. A 'set' of wheels shall be used to describe the rear wheel or wheels and the front wheel or wheels, and should be read as meaning either a single wheel or a pair.

A mower handle 7 is connected to the rear of the deck, approximately at the rear corners of the deck 2, above the rear wheels 6, the handle 7 running backwards and upwards. The mower handle 7 includes user controls 8. The mower handle 7 is adapted to be gripped by a user in use to control the direction in which the mower 1 is travelling. The mower handle 7 may also include controls for controlling the speed at which the mower is travelling (if the mower is optionally of the 'self-propelled' type) and the speed at which the cutting blades are rotating. Other secondary user controls such as a choke 9 may be located on the handle 7.

The mower handle 7 also includes an adjustment mechanism 10 to allow the length or height of the mower handle 7 to be adjusted, and/or other adjustments such as the orientation to be altered to suit an individual user.

The mower is of the type where the ride height or cutting height can be adjusted. The height of the wheels relative to the deck can be changed by a simple mechanical mechanism such as is known in the art. For example, via lever 17. Adjusting the ride height or cutting height means that the deck (and everything connected to it) move relative to the wheels. One effect of adjusting the ride height or cutting height is that the gap between the lower edge of the side wall 3 and the ground (a horizontal surface) will change.

The mower also preferably has 'rake', or is 'raked'. That is, it is tilted forward slightly. The gap between ground and the lower edge of the deck at the front wheels is less than the gap between the lower edge of the deck and the ground at the rear wheels. The difference is usually around 10 mm—i.e. when the gap at the front is around 10 mm, the gap at the rear will be around 20 mm.

A catcher 11 is connected to the rear of the mower deck 2, underneath the handle 7. The catcher 11 is removably attached to the mower deck 2 so that a user can remove it in use for emptying, maintenance or similar. When 'mower' is used in this specification, it should be noted that this could mean with or without a catcher such as catcher 11 connected to the mower. That is, 'mower' could be inclusive or exclusive of a catcher.

In the most preferred form, the mower includes a rear flap 40, pivoted from the top rear edge of the deck. This is lifted up the allow the catcher 11 to be attached in use, with the rear flap resting on (and in the most preferred embodiment acting as a lid for the partly open top of) the catcher 11.

The mower 1 also preferably includes a chipper tube 12 located at the rear left-hand corner of the deck 2. The chipper tube is preferably integrally connected to the deck 2. The chipper tube 12 extends upwards from the deck 2 and is angled slightly towards the rear of the mower 1. The preferred embodiment of the chipper tube 12 has an entry aperture 13 at the upper end of the chipper tube. The lower end connects with the deck 2 and is mutually adapted (along with the deck 2) so that the lower end opens into the cutting space 70 so that items falling down or pushed down the length of the tube 12 will fall through the lower end into the cutting space 70 underneath the deck 2. The upper end of the chipper tube 12 in the most preferred forms include a lid 15.

A set of grass cutter blades 16 and a set of chipper blades 14 are located within the cutting area 70. In the preferred embodiment, the chipper blades are heavy, thick, short blades, or blades that are somewhat shorter and heavier than the grass cutting blades attached to a disc, and the grass cutting blades are lighter, thinner, longer blades attached to a disc which may have a smaller radius.

In the preferred embodiment, there is a chipper bar blade having two cutting ends, and two or four grass cutting blades arranged at equally spaced intervals around a disc. However, any number of blades from one upwards could be used as required, and these do not have to be connected to a disc.

Both sets of blades are connected to a vertically aligned drive shaft, at least the lower part of which extends downwards from the motor 4 into the cutting space 70 at substantially the centre of the cutting space 70. The connection of the blades to the drive shaft causes the blades to rotate in substantially horizontal planes, one above the other, around a common axis. The chipper blades rotate in a chipping plane, the tips of the blades defining the circumference or perimeter of a chipper cutting circle. The grass cutting blades rotate in a grass cutting plane, the tips of the blades defining the circumference or perimeter of a grass cutting circle. The chipper blades are located above the grass cutter blades. The chipper blades are heavier and larger than the grass cutter blades, as described above. The grass cutter blades are adapted so that when they are spinning, they will cut any grass which they contact. The chipper blades are specifically adapted to chip or shred items such as small braches or other similar garden refuse.

It should be noted that other forms of blades are possible other than a pair of grass cutting blades or a pair of chipper blades. Three, four or more blades could be used, possibly attached to a central disc or similar.

The lower end of the chipper tube 12 is connected to the deck 2 at or towards one of the rear corners of the deck 2. In the most preferred form it is connected at the left rear corner (from the point of view of a user operating the mower)—that is, the other side of the deck centre line from the funnel 60. The lower end of the chipper tube 12 opens into the cutting space 70 as described above. As can be seen in FIG. 1, the lower end is connected to the deck 2 in such a manner that the opening at lower end is directly above both sets of blades and within the perimeter or circumference of the cutting circles formed by rotation of the blades. However, it is only necessary that the opening is above the chipper blades. It is not necessary that the chipping and cutting circles be the same size.

In use, a user introduces items into the top end of the chipper tube 12, either pushing these down or allowing them to fall under gravity so that they come out of the lower end of the tube into the cutting space 70, and then drop (or are pushed) into the disc formed by the rotating chipper blades 14, to be chipped or shredded. It is preferred that at least the front part of the tube 12 extends to just above the chipper blades, so that the front part or front face acts at least partly as an 'anvil', the blades driving refuse onto the front face, and then passing just underneath the front face to chip off that part of the refuse that extends just below the lower edge of the front face.

In use the operation is as follows: a user pushes the mower forwards along the grass that he or she desires to be cut, stopping occasionally to pick up heavier garden waste such as small windfall branches or similar. With reference to FIG. 3, both sets of blades 14, 16 are spinning clockwise. That is, from a users left (away from a user on the left-hand side of the mower 1) towards their right (towards a user on the right-hand side of the mower 1). This is shown by arrows 22 on FIG. 3. The front edge of the side wall 3 passes over the grass to be cut and the front edge of the spinning disc of the grass cutting blades 16 encounters the long grass in the cutting area, cutting the top portion off so that it is cut to the height of the blades above the ground. The grass cuttings are flung or thrown backwards by the rotating blades along the right-hand side of the cutting space 70 towards the rear of the mower 1. The mower deck 2 is shaped so that in plan view it has the shape of a volute, as noted above, and the right-hand side is funnel-shaped or forms a funnel 60, expanding towards the rear of the mower 1. At least the right-hand rear side of the mower deck 1 is formed as an exit aperture 21.

As can be seen in FIG. 3, the chipper tube 12 is located at the rear left-hand corner of the mower deck 2, just in front of the left-hand rear end corner of the volute-shaped deck 2. The chipper tube 12 is preferably angled backwards, and this offers an advantage in that a user at the rear of the mower 1 can add material easily to the chipper tube 12. Also, it is much less likely that material will be ejected up and out of the tube 12 in use, as it is angled away from the direction of spin of the blades. This is safer for a user.

One issue that has arisen with combination mowers and chipper/shredders is that of safety. As has been outlined above, a gap between the lower edge of the side wall and ground level is highly desirable, as the resulting air flow helps with efficiency. However, the gap must be arranged in such a manner that the safety of a user is not compromised, and especially when the chipper is used.

It is possible for mower mechanisms to become clogged with cuttings or similar, and for the mower to stall or otherwise cease operating for reasons that may not be immediately apparent. This is especially true for mowers that also incorporate a chipper or shredder mechanism, as the types of material which are fed into the mower tend to be of the type that will jam mechanisms more easily, and not be mulched or pulped by moving parts as easily as grass may be. Accidents can easily be caused by users attempting to manually remove jammed items from mowers which have not been correctly deactivated. In order to achieve a suitable compromise between efficiency and safety, the mower 1 described herein incorporates several safety mechanisms which are intended to help prevent accidents of this type. These are described below:

Skirt

Firstly, the mower 1 is fitted with a skirt 100 or, more preferably, a pair of skirts 100. In use, one of the pair of skirts is connected to one side of the mower, running substantially between the front and rear wheels, with an equivalent second skirt connected on the other, opposite side of the mower, running between the front and rear wheels on the opposite side. The skirts on each side of the mower are effectively mirrors of one another. For the purposes of this specification, one skirt only will be described, but it should be noted that in the preferred embodiment, a second, substantially identical skirt will be fitted on the opposite side. It should be noted that the skirt is a separate, distinct item from the deck 2.

Figure 4A:
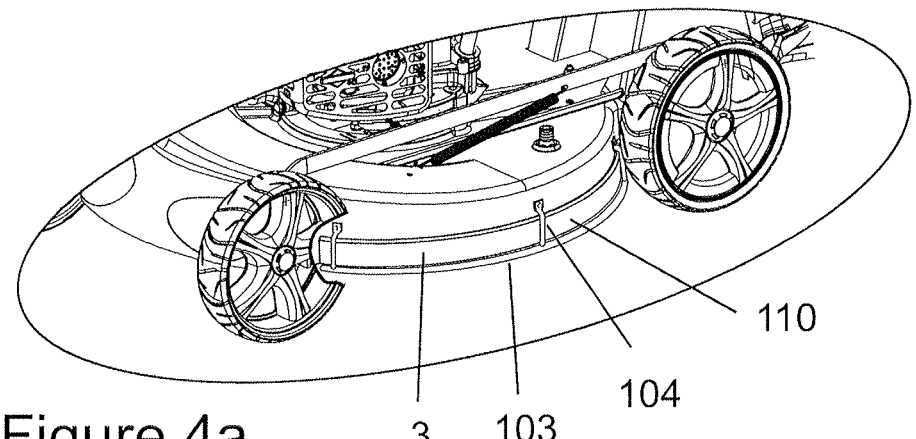
FIG. 4a shows a close up perspective view (with partial cut away) of the mower of FIGS. 1 to 3 fitted with one variant of a skirt on the side wall of the mower.
Figure 4B:
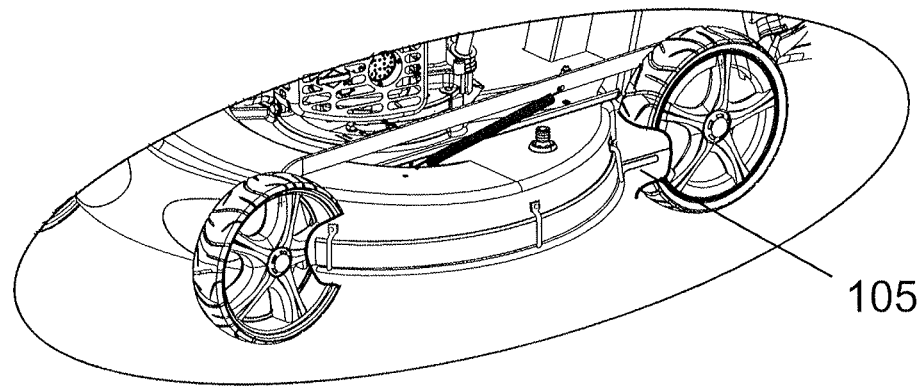
FIG. 4b shows a close up perspective view (with partial cut away) of the mower of FIGS. 1 to 3 fitted with another variant of a skirt on the side wall of the mower.
Figure 4C:
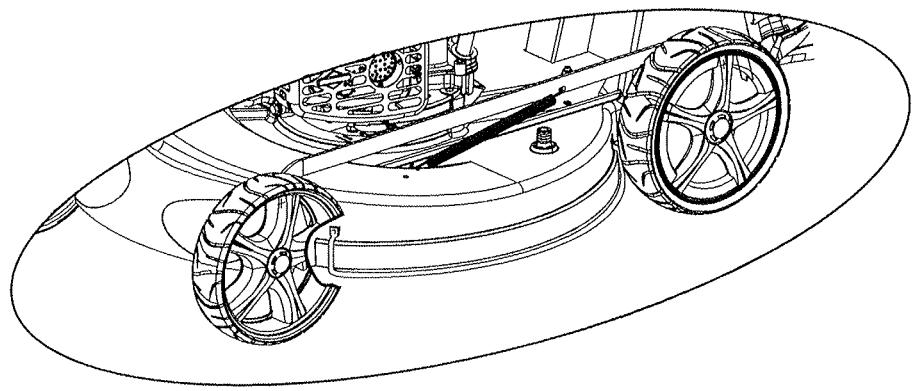
FIG. 4c shows a close up perspective view (with partial cut away) of the mower of FIGS. 1 to 3 fitted with yet another variant of a skirt on the side wall of the mower.

The preferred embodiment of the skirt 100 will now be described with reference to FIGS. 4*a-c*. According to one embodiment the skirt 100 comprises a wire framework, the framework having a main body that forms an elongate ground guard 103 and at least one (but in the preferred embodiment) three attachment sprigs 104 which extend generally perpendicularly and in the same direction as one another from the ground guard 103. The elongate ground guard runs substantially horizontally in use when the skirt 100 is attached to the mower. The attachment sprigs run substantially vertically upwards from the ground guard. The (preferred) three sprigs are arranged one at each end or substantially towards the end of the ground guard, and one substantially in the centre. When attached to the mower, and when the mower is viewed from the side, the preferred form of skirt 100 therefore has the overall appearance of a capital letter 'E' turned on its back.

Each of the sprigs 104 is bent or contoured slightly inwards (as they extend upwards towards the mower body). Each of the sprigs includes an attachment aperture or similar at its upper end, to allow a bolt or similar to pass through and then through the mower body, to attach the skirt 100 to the main body of the mower. As the sprigs are contoured inwards slightly, the lower part of the skirt, which includes the ground guard, will stand away from, or slightly proud of the side wall of the mower. That is, there is a gap having at least a horizontal component between the mower side wall and the skirt. That is, viewed directly from above, there is a gap between the side wall and the guard. It is preferred that the skirt is formed and shaped, and attached to the side wall, in such a manner there is some overlap between the top of the guard and the lower edge of the side wall when viewed horizontally from the side. However, in alternative embodiments, the skirt can be formed and shaped, and attached to the side wall, in such a manner that the gap also has a vertical component between the side wall and the guard, at least towards the rear of the mower.

As outlined above, it is usual for mower decks to be 'raked'. Therefore, the ground clearance between the side wall and the ground at the front of the mower (e.g. around the front wheel) is typically approximately 10 mm, lower than at the rear. The vertical component of the gap referred to therefore means that, when viewed horizontally from the side, there is a gap between the top of the guard 103 and the lower edge of the side wall 3, at least at or towards the rear of the mower.

The skirt may not be raked, and ground clearance between the lower part of the skirt and the ground may be consistent from the front to the rear of the mower. Preferably the whole of the skirt 100 is formed from wire having a diameter of around 5 mm-7 mm. This desirably gives the lower part of the skirt a rounded appearance, and no sharp edges either at the bottom or on the sides. As shown in FIG. 4, the skirt 100 is also contoured to follow the plan-view curve of the mower deck and side wall. As can be seen from the figures, when the skirt 100 is attached to the side wall of the mower, a gap is created between the upper inner part of the skirt and the side wall. That is, there is at least a horizontal and preferably also a vertical gap created between the side wall and the skirt in at least part of the space between the front wheel set and the rear wheel set.

In the most preferred form, this gap is created to be small enough so that industry-standard finger test probes (articulable like finger joints and with a 12 mm tip) cannot pass between the ground guard 103 and the side wall 3 into the cutting space 70 under the deck.

It is not necessary for the ground guard to run the full length of the side of the mower between the front and rear wheels. However, as shown in FIG. 4, it is extremely desirable that it does so, and if necessary, extension pieces 105 can be added to ensure that it does so, as shown in FIG. 4b. It should also be noted at the two ends sprigs could be used without the centre sprig, as shown in FIG. 4c. It is most preferred that the ground guard passes along the full length, or substantially the full length, between the front and rear wheels, so that there is no gap at either end.

Also, the skirt is formed and attached to the side wall of the mower so that a standard finger test probe cannot pass underneath the skirt—between the lower part of the skirt and the ground—and under the side wall. That is, the gap is insufficient to allow the passage of a standard finger test probe into the cutting area—the tip of a finger test probe will not pass under the side wall: it will be blocked by the skirt first.

In the most preferred embodiment, a guard strip 110 of rubber or plastic material is connected to the side wall on the outside of the side wall of the mower. When the skirt 100 is connected to the side wall 3, it is most preferred that the guard strip 110 does not completely fill the gap between the frame and the side wall over the entire length of the space between the front and rear wheels. There is still a gap at least towards the rear of the mower. However, in the preferred form, at least towards the front of the mower, the guard strip completely fills the gap both horizontally and vertically.

Chipper Tube Cut-Off

It is highly preferred that the chipper/shredder of the combination mower & chipper/shredder can only be operated when the mower is at a low ride height in order to improve safety. According to another aspect, the chipper can only be operated at its lowest ride height or cutting height. There are generally two preferred ways in which these options can be achieved, by switch or by lockout. Several variations will now be described in more detail.

Figure 5A:
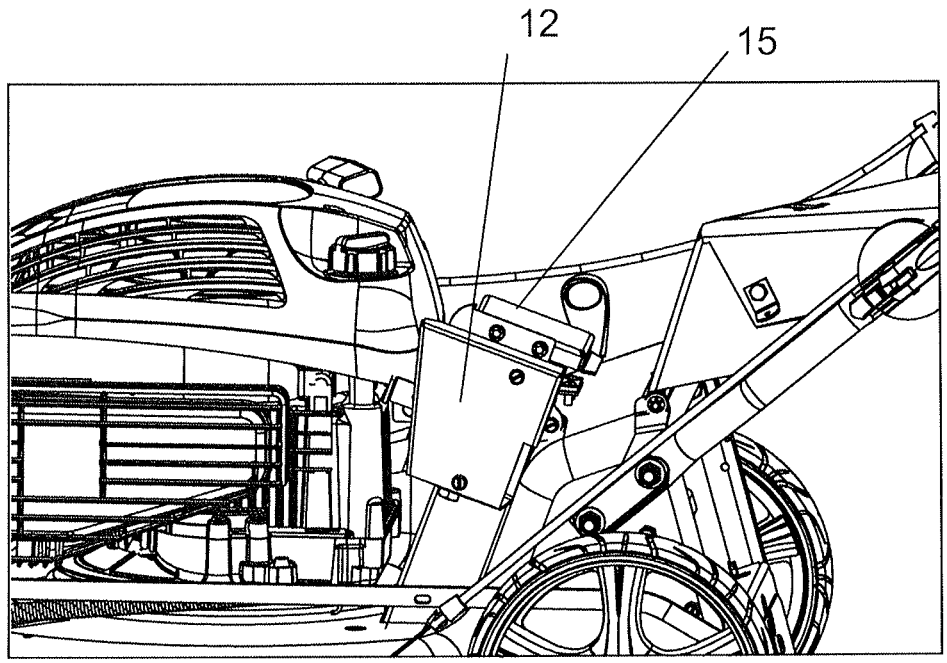
FIG. 5a shows detail of a first preferred form of safety mechanism for the mower, showing detail of a chipper tube with a spring-loaded lid shown in a closed position.
Figure 5B:
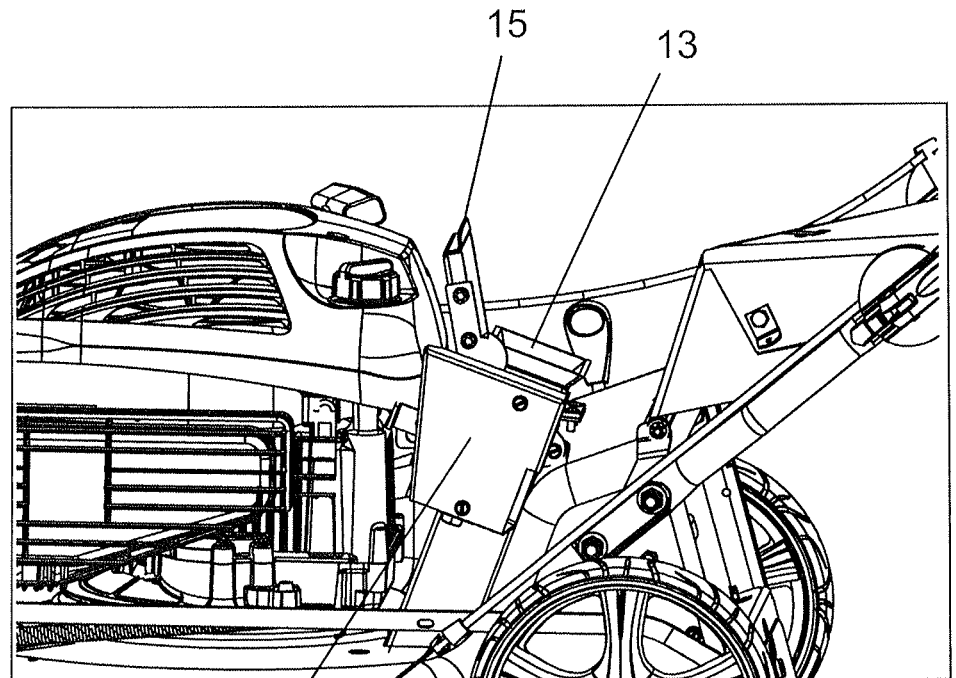
FIG. 5b shows detail of a first preferred form of safety mechanism for the mower, showing detail of a chipper tube with a spring-loaded lid shown in an open position.
Figure 6:
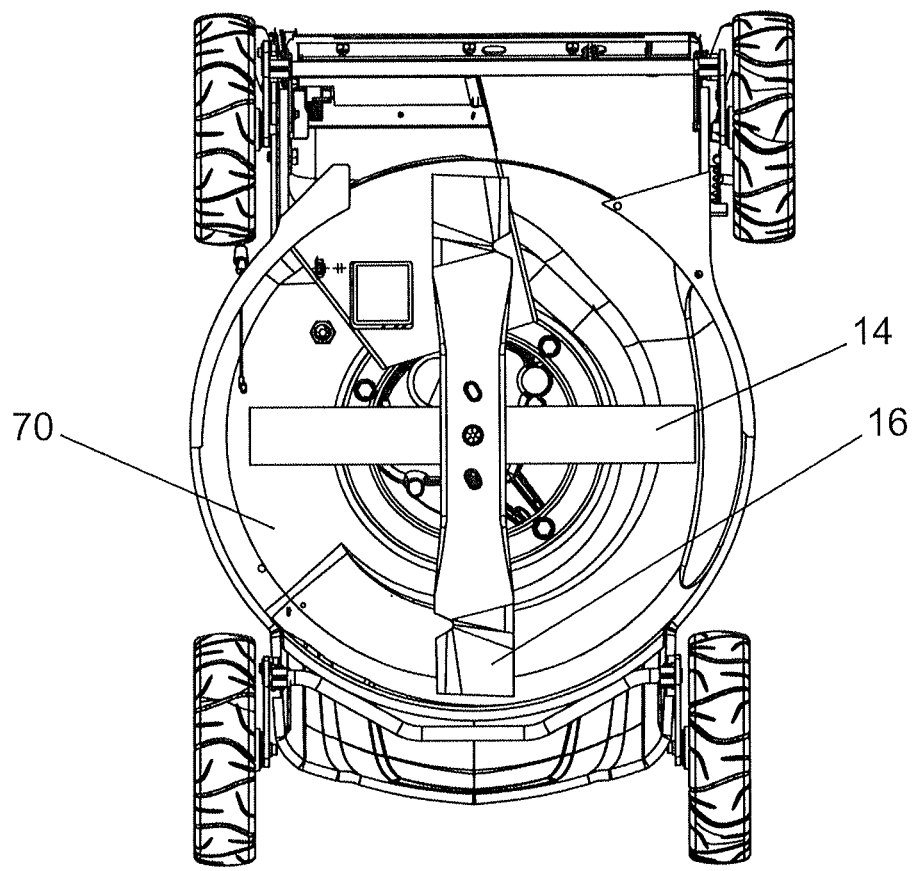
FIG. 6 shows a bottom view of the mower of FIGS. 1 and 2 showing one form of grass cutting blade and chipper blade.
Figure 12:
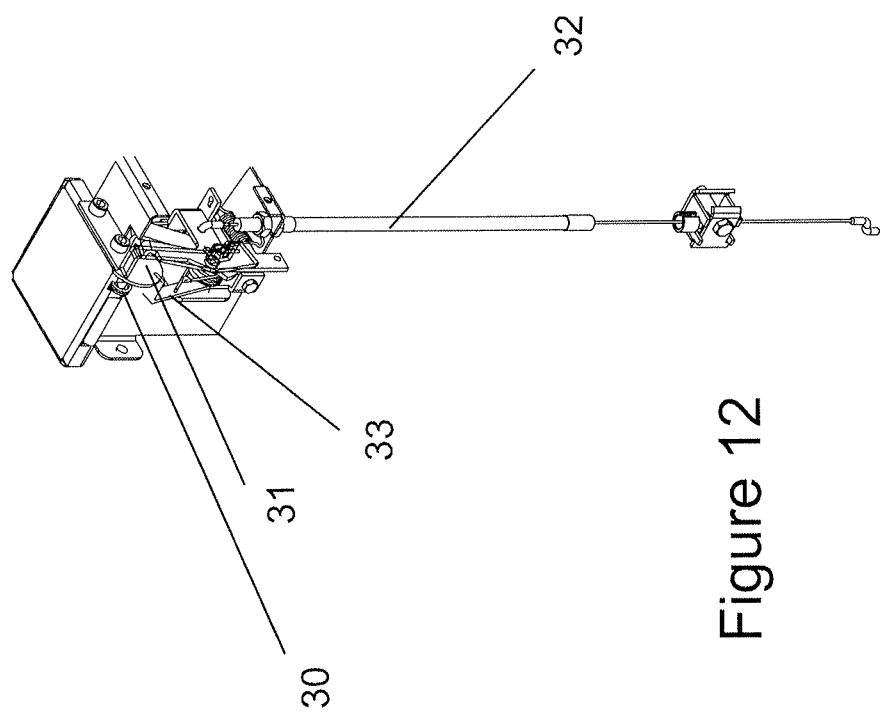
FIG. 12 shows detail of a preferred latching mechanism, shown uninstalled on a mower.

Firstly, with reference to FIGS. 5 and 12, the chipper tube 12 has a lid or cover 15. The lid 15 is preferably biased towards a 'closed' position as shown in FIG. 5. The lid 15 is biased by a spring 30.

When the cover is closed, the chipper cannot be used as the tube 12 cannot be accessed. In the most preferred form, the chipper tube includes a latch 31 and sear 33 to hold the lid 15 in the open position when the mower is lower than a predetermined ride height or alternatively at the lowest ride height. If the mower is moved away from the predetermined lowest cut or ride height, then the sear 33 disengages from the latch and the lid closes under the influence of spring 30.

This is achieved by connecting the lid to wire 32, which is preferably a bowden wire or bowden cable. The wire 32 is connected to the mower in such a manner that if it is pulled beyond a certain point—the cut-off point—it will act to move the sear 33 and unlatch the lid 15. The mower, chipper tube lid, and wire are all dimensioned and adjusted so that the cut-off point is a point just above a low ride height (or alternatively just above the lowest ride height). If the mower is adjusted upwards beyond this position, then sufficient tension comes into the cable to operate the mechanism to disengage the latch and the lid 15 will close.

In an alternative embodiment, the mechanism (via the Bowden wire) can be coupled to the motor to kill the motor (via the throttle cable) if the lid 15 is opened and the mower is above a threshold ride height.

In an still further alternative embodiment, the mechanism may be configured to lock the lid closed when the mower is above the predetermined low ride height. In such an embodiment, the lid may be biased closed by a spring 30 and provided with a latching mechanism that prevents opening of the lid unless the mower is at a sufficiently low ride height. It is also preferable that the latching mechanism is optionally of a type that will allow the lid to lock closed with the mower in any ride height position above the predetermined threshold ride height. That is to say, if the mower is adjusted above the predetermined ride height while the lid 15 is open, the latch will lock as soon as the lid is next closed. However the latching mechanism will only allow the lid to unlock when the mower is at or below a predetermined minimum ride height. In these embodiments, a user will be prevented from accessing the chipper tube unless the mower is adjusted to an appropriate ride height.

Figure 10:
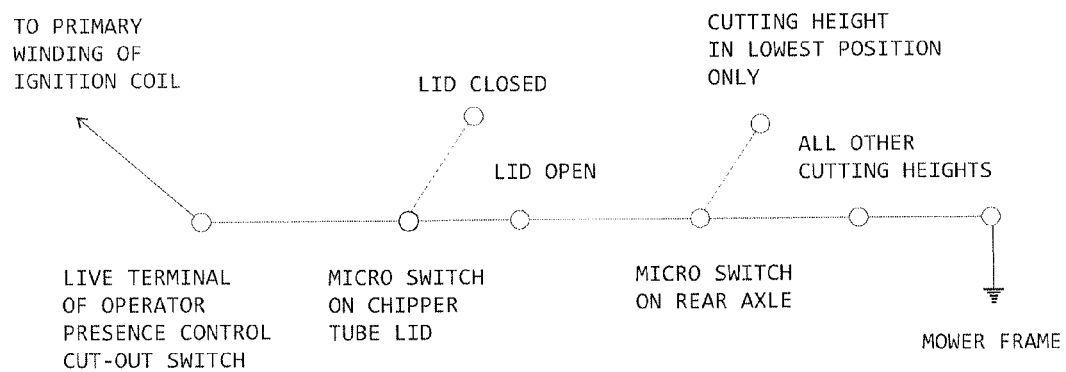
FIG. 10 shows detail of a circuit diagram for a circuit that operates including two micro-switches
Figure 11:
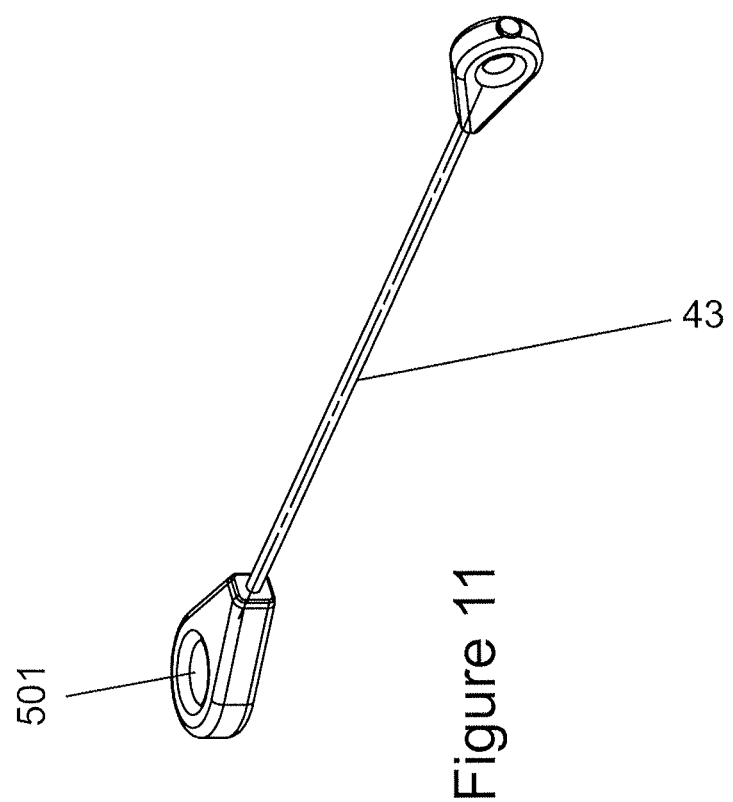
FIG. 11 shows detail of a cable or wire which is used as part of a biasing mechanism that is adapted to bias at least a flap and preferably also a sub-flap towards a closed position.

With reference to FIGS. 5 & 10, the second preferred method is via a pair of micro switches 120, 121 arranged in series. One microswitch 120 is connected to the lid or cover 15 of the chipper tube and is configured to be closed when the lid is open. The second microswitch 121 is on the mower deck and will be closed in any mower position except when below the predetermined threshold low ride height (or lowest ride height). If the lid 15 is opened, the engine will cut off if the mower is in any position except the lowest ride height.

It will be appreciated with reference to FIG. 10 that the mower engine will stop if the primary winding ignition coil is grounded.

Microswitches 120, 121 function so that with microswitch 120 open (ie when the lid is closed) the mower engine will run irrespective of the position of ride height microswitch 121. In addition, if microswitch 121 is closed (ie when the mower is in any ride height above a predetermined level) the mower will be stopped if microswitch 120 is closed (ie if the lid is open).

This arrangement effectively prevents the mower from running if the chipper tube lid is opened and the ride height is above a predetermined level.

According to one embodiment, the predetermined level is the mowers lowest ride height setting.

It will be appreciated the alternative switch configurations may be employed to achieve substantially the same result.

Rear Flap Safety Mechanism

As generally illustrated in FIGS. 1-3, in the most preferred form, the mower includes a rear flap 40, pivoted from the top rear edge of the deck. This is lifted up to allow the catcher 11 to be attached in use, with the rear flap resting on (and in the most preferred embodiment acting as a lid for the partly open top of) the catcher 11. The most preferred form of rear flap includes a sub-flap 40*a*, as shown in more detail in FIGS. 7-8, which can open independent of the remainder of the flap 40. The sub-flap 40*a* is biased open via spring 42.

Figure 8:
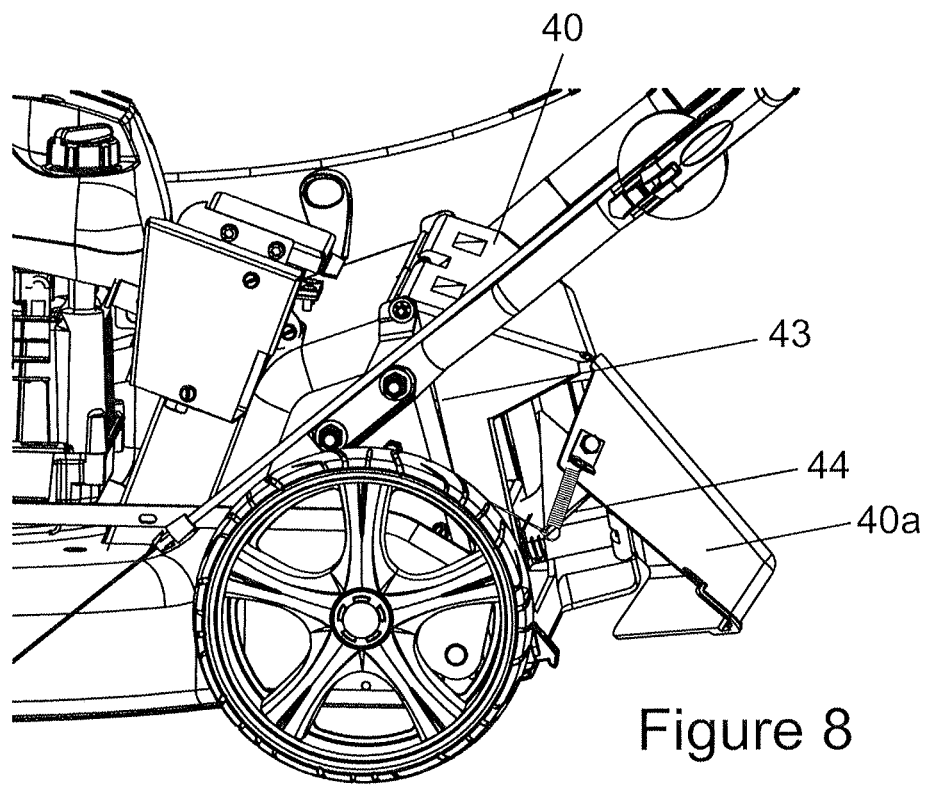
FIG. 8 shows detail of the mower of FIG. 7 with a grass catcher not attached to the mower, the figure showing the wire at a 'slack position', the flap shown closed and the sub-flap shown slightly open in a manner that in use would allow grass to discharge through the sub-flap aperture.
Figure 9:
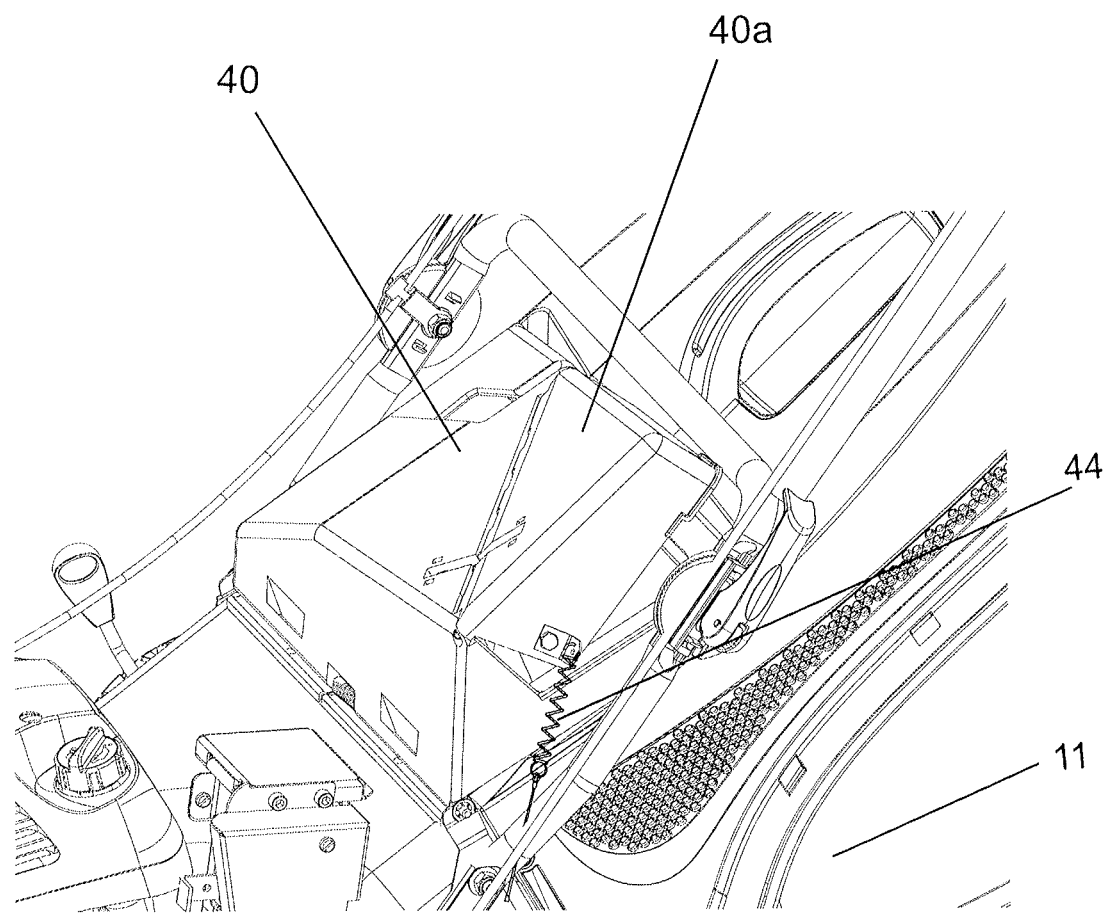
FIG. 9 shows a side perspective view of the mower and catcher with the sub-flap above the normal 'in use' position.

This is intended for use when the mower is being used without a grass catcher, so that with the flap 40 in the lowered position (illustrated in FIG. 8), grass can still discharge from the inside of the mower to the outside through open flap 40*a*. In this position, sub-flap 40*a* acts as a deflector to direct the grass clippings to eject out the side of the mower. However, when the mower is being used with a grass catcher, as illustrated in FIG. 1, the sub-flap 40*a* is redundant, and it can be dangerous for a user to open this and access the interior of the mower through the sub-flap while the mower is running (as illustrated in FIG. 9).

Figure 7:
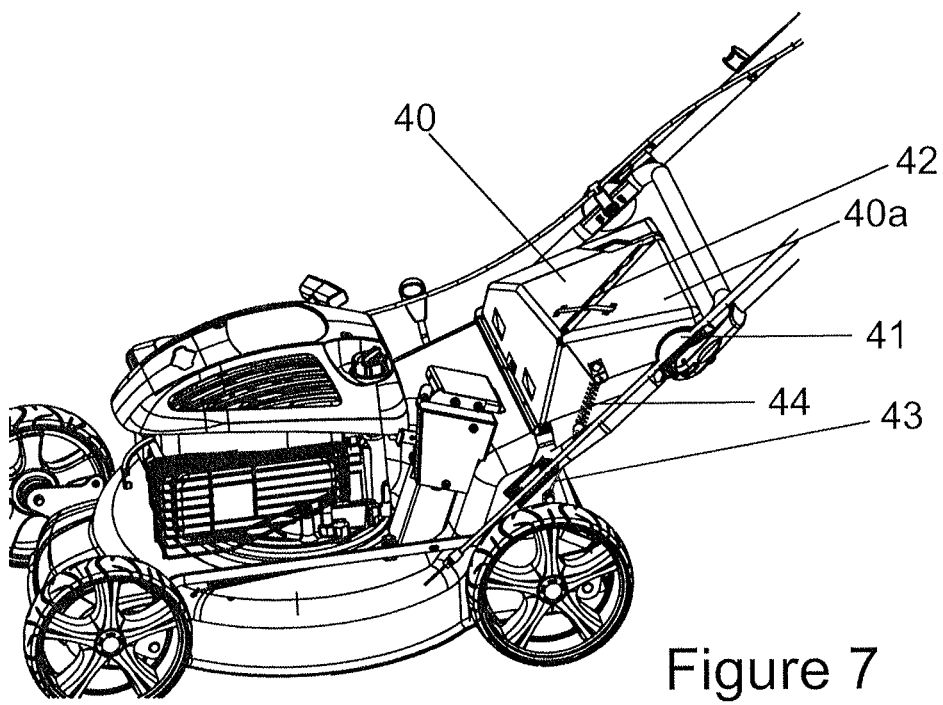
FIG. 7 shows a side view of a mower (without catcher shown) with the cable and spring schematically illustrated as it would be "in use" with a catcher attached, and biasing the flap and sub flap towards a closed position.

The mower of the present invention in one form is fitted with a safety mechanism in the form of a safety clip 41, which is connected to the body of the mower (e.g. at the handle 7), so that the sub-flap 40*a* cannot be raised any higher than the main body of the flap 40 when the grass catcher is attached. That is, the sub-flap cannot be physically be opened when the flap 40 is raised into the position it would normally be in when the catcher is attached (illustrated in FIG. 7). The safety clip physically blocks the biased sub flap 40*a* (and the main flap 40) from moving up any further and opening. For example, as illustrated in FIG. 7 the flap 40 and sub-flap 40*a* cannot be raised any higher because it would impinge on clip 41 on handle 7 (or a part attached thereto). Accordingly, neither flap 40 or sub-flap 40*a* can be raised when the catcher is in place in such a manner as to allow access into the catcher area where hazards may exist.

In another form, the mower is fitted with a second form of safety mechanism(s) that biases the sub-flap closed, while still allowing the user to open sub-flap if necessary. This second form of safety mechanism will now be described in detail with particular reference to FIGS. 7-9. A non-extensile wire 43 is shown in series with an extensible portion 44. Preferably wire 43 is a metallic cable and extensible portion 44 is a spring such as a coil spring or similar.

Preferably, each portion 43, 44 accounts for approximately half the linear length of the combination when laid flat. Preferably, the wire 43 is formed so that the point at which the end of wire 43 meets the spring portion can bend and/or pivot freely, so the two portions can freely move relative to one another. The free end of the first portion (the first end) ends in a first end eyelet or similar. The free end of the second portion (the second end) is also formed as a second end eyelet or similar.

The first end eyelet 501 is connected to the mower body in such a manner that it can freely rotate around or relative to the mower body. The second end eyelet is connected to the side of the sub-flap 40*a* in a similar manner—so that it can rotate freely relative to the sub-flap 40*a*, but not slide free or come loose. The dimensions of the wire and spring 43, 44 and the attachment positions of the eyelets on the main body and the sub-flap respectively, are chosen so that when the rear flap 40 (and sub flap 40*a*) is raised to just above horizontal (i.e. the position it is on when the grass catcher is fitted), the spring will be extended and there will be tension in the spring.

One difficulty with arrangements such as that described above is that the mower handle usually tends to block or otherwise impede the connection of the wire to the mower and flap, and the operation of flap. Also, mechanisms such as this tend to impede connection or disconnection of the grass catcher, and it is difficult to locate these mechanisms in a position such that they will be both effective and not impede operation.

Surprisingly, it has been found that the following elements, either singly or in combination, help to achieve a solution to this issue. Firstly, placing the spring portion 44 at the upper end of the wire 43 (when the flap is open) so that it does not interfere with the handle when moving, or interference with the handle is minimised. Secondly, fixing the points around which the ends of the wire pivot in fixed positions relative to the mower body and the sub-flap respectively (prior art solutions have used sliding or moveable points). Thirdly, when the flap is closed, the wire has a large amount of slack in it, and can also pivot around the point at which it turns from a wire into a spring to take advantage of this. Fourthly, choosing the connection positions and the dimensions of the wire so that the slack will only be fully taken up, and tension come into the spring, just before the flap reaches the horizontal position when it is being opened (or equivalent if the sub-flap is opened independently).

Surprisingly, it has been found that these elements allow the flap to be rotated from a closed position (blocking the rear of the mower) to an open position (roughly horizontal or just above horizontal) with spring tension coming on to the spring portion of the wire just below horizontal, with little to no impedance of the operation, e.g. connection/disconnection, of the grass catcher, and opening/closing of the flap.

It can be seen that both the flap 40 and the sub-flap 40*a* will be spring loaded when the grass catcher is in position. The sub-flap can be opened further if required—i.e. by lifting it up further as illustrated in FIG. 9. However, this will place further tension on the spring, and tend to pull the sub-flap 40*a* closed. The arrangement of the three elements outlined above also allow the flap and the sub flap to be independently moved—i.e. the sub-flap can be closed onto the main flap as the main flap is being opened, and vice-versa. The flap and sub-flap can be rotated all the way up to a vertical or near vertical position if required.

Preferred Features:

1. A lawn mower with an integral chipper or shredder, comprising:
   a deck, forming a platform and having an exit aperture at the rear of the deck,
   a side wall arranged around at least part of the perimeter of the deck, the deck and the side wall enclosing a cutting space under the deck,
   a front wheel set and a rear wheel set located at the front and the rear of the deck respectively,
   a motor attached to the outside top of the platform of the deck, having a drive shaft extending downwards through the deck, the lower part of the drive shaft located substantially at the centre of the cutting space,
   at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane,
   at least one skirt, connected to the side wall on one side of the mower between the front wheel set and the rear wheel set, and formed so that when connected the main body of the skirt extends below the lower edge of the side wall and there is a gap between the side wall and the main body, the skirt extending between at least part of the space between the front wheel set and the rear wheel set.

2. A lawn mower according to clause 1 wherein the gap between the side wall and the main body of the skirt has at least a horizontal component in at least part of the space between the front wheel set and the rear wheel set.
3. A lawnmower according to clause 1 wherein the gap between the side wall and the main body of the skirt has at least a vertical component in at least part of the space between the front wheel set and the rear wheel set.
4. A lawnmower according to clause 1 wherein the gap between the side wall and the main body of the skirt has a vertical and a horizontal component in at least part of the space between the front wheel set and the rear wheel set.
5. A lawn mower according to any one of clauses 1 to 4 wherein the skirt extends the whole length of the side wall between the front wheel set and the rear wheel set.
6. A lawn mower according to any one of clauses 1 to 5 wherein the main body of the skirt runs substantially horizontally when the skirt is attached to the mower.
7. A lawn mower according to any one of clauses 1 to 6 wherein the skirt has at least one and preferably three attachment sprigs extending upwards from the main body of the skirt.
8. A lawn mower according to any one of clauses 1 to 7 wherein the skirt is formed from wire having a substantially round cross-section.
9. A lawn mower according to clause 8 wherein the wire has a diameter of between 4 and 8 mm.
10. A lawnmower according to any one of clauses 1 to 9 wherein the skirt is formed and attached to the side wall such that the gap between the skirt and the ground is insufficient to allow the passage of a standard finger test probe when the mower is set at the lowest cutting or ride height.
11. A lawnmower according to any one of clauses 1 to 10 wherein a guard strip is connected to the side wall on the outside of the side wall of the mower.
12. A lawnmower according to clause 11 wherein the guard strip is formed from plastic or rubber.
13. A lawnmower according to any one of clauses 1 to 12 wherein the mower is fitted with a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.
14. A lawnmower according to clause 13 wherein the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.
15. A lawnmower according to any one of clauses 1 to 12 wherein the lawnmower is fitted with a pair of microswitches, the first microswitch connected to the lid of the chipper tube, and adapted to close and thus stop the lawnmower engine from running when the lid is opened, and a second microswitch located on the lawnmower such that only when the switch is open (at the lowest ride height or cutting height) can the lid be opened to enable the chipper function.
16. A lawnmower according to any one of clauses 1 to 15 wherein the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a safety clip, adapted so that at least the sub-flap cannot be raised any higher than the normal operating position that the flap and sub-flap would be in when a grass catcher were attached.
17. A lawnmower according to any one of clauses 1 to 15 wherein the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.
18. A lawnmower according to clause 17 wherein the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.
19. A lawnmower according to clause 18 wherein the location of the connection points and the dimensions of the wire are chosen so that the spring is only just in tension when the flap and sub-flap are raised into the same or a similar position to that which they would be in with a grass catcher attached.
20. A lawnmower according to clause 18 wherein at least the first end of the wire is formed as an eyebolt.
21. A lawnmower according to any one of clauses 18 to 20 wherein the wire is formed so that that part of the wire formed as a spring can move and pivot freely relative to the remainder of the wire when not in tension.
22. A lawnmower according to any one of clauses 18 to 21 wherein that part of the wire formed as a spring is uppermost when the grass catcher is connected.
23. A lawn mower with an integral chipper or shredder, comprising:
a deck, forming a platform and having an exit aperture at the rear of the deck,
a side wall arranged around at least part of the perimeter of the deck, the deck and the side wall enclosing a cutting space under the deck,
a front wheel set and a rear wheel set located at the front and the rear of the deck respectively,
a motor attached to the outside top of the platform of the deck, having a drive shaft extending downwards through the deck, the lower part of the drive shaft located substantially at the centre of the cutting space, at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane, a chipper tube having an upper end and a lower end, the lower end opening into the cutting space above and within the perimeter of the cutting disc formed by rotation of the at least one chipper blade in use, the chipper tube having an integral lid which is normally closed when the mower is operating, the lid fitted with a cut-off mechanism so that if the lid is opened when the ride height or cutting height of the mower has been adjusted to any position except the lowest position, the cut-off mechanism will stop the mower engine.

24. A lawnmower according to clause 23 wherein the cut-off mechanism is a wire connected between the chipper tube lid and the mower engine, the lawnmower, chipper tube lid, and cut-off wire all dimensioned and adjusted so that the lawnmower engine will run without interruption when the lid is closed, but the wire will be pulled beyond the engine cut-off point and stop the engine when the lid is opened and also when the mower is adjusted to any point except the lowest ride height or cutting height.

25. A lawnmower according to clause 23 wherein the lawnmower is fitted with a pair of microswitches, the first microswitch connected to the lid of the chipper tube, and adapted to close and thus stop the lawnmower engine from running when the lid is opened, and a second microswitch located on the lawnmower such that only when the switch is open (at the lowest ride height or cutting height) can the lid be opened to enable the chipper function.

26. A lawnmower according to clauses 23 to 25 wherein the lawnmower further has at least one skirt, connected to the side wall on one side of the mower between the front wheel set and the rear wheel set, and formed so that when connected the main body of the skirt extends below the lower edge of the side wall and there is a gap between the side wall and the main body, the skirt extending between at least part of the space between the front wheel set and the rear wheel set.

27. A lawn mower according to clause 26 wherein the gap between the side wall and the main body of the skirt has at least a horizontal component in at least part of the space between the front wheel set and the rear wheel set.

28. A lawnmower according to clause 26 wherein the gap between the side wall and the main body of the skirt has at least a vertical component in at least part of the space between the front wheel set and the rear wheel set.

29. A lawnmower according to clause 26 wherein the gap between the side wall and the main body of the skirt has a vertical and a horizontal component in at least part of the space between the front wheel set and the rear wheel set.

30. A lawn mower according to any one of clauses 26 to 29 wherein the skirt extends the whole length of the side wall between the front wheel set and the rear wheel set.

31. A lawn mower according to clause 26 to 30 wherein the main body of the skirt runs substantially horizontally when the skirt is attached to the mower.

32. A lawnmower according to any one of clauses 26 to 31 wherein the skirt has at least one and preferably three attachment sprigs extending upwards from the main body of the skirt.

33. A lawn mower according to any one of clauses 26 to 31 wherein the skirt is formed from wire having a substantially round cross-section.

34. A lawn mower according to clause 33 wherein the wire has a diameter of between 4 and 8 mm.

35. A lawnmower according to any one of clause 26 to 34 wherein the skirt is formed and attached to the side wall such that the gap between the skirt and the ground is insufficient to allow the passage of a standard finger test probe.

36. A lawnmower according to any one of clauses 26 to 35 wherein a guard strip is connected to the side wall on the outside of the side wall of the mower.

37. A lawnmower according to clause 36 wherein the guard strip is formed from plastic or rubber.

38. A lawnmower according to any one of clauses 23 to 37 wherein the integral lid is spring-loaded and biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

39. A lawnmower according to clause 38 wherein the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

40. A lawnmower according to any one of clauses 22 to 39 wherein the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a safety clip, adapted so that at least the sub-flap cannot be raised any higher than the normal operating position that the flap and sub-flap would be in when a grass catcher were attached.

41. A lawnmower according to any one of clauses 23 to 40 wherein the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

42. A lawnmower according to clause 41 wherein the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

43. A lawnmower according to clause 42 wherein the location of the connection points and the dimensions of the wire are chosen so that the spring is only just in tension when the flap and sub-flap are raised into the same or a similar position to that which they would be in with a grass catcher attached.

44. A lawnmower according to clause 43 wherein at least the first end of the wire is formed as an eyebolt.

45. A lawnmower according to any one of clauses 42 to 44 wherein the wire is formed so that that part of the wire formed as a spring can move and pivot freely relative to the remainder of the wire when not in tension.

46. A lawnmower according to any one of clauses 42 to 45 wherein that part of the wire formed as a spring is uppermost when the grass catcher is connected.

47. A lawn mower with an integral chipper or shredder, comprising:
a deck, forming a platform and having an exit aperture at the rear of the deck,
a side wall arranged around at least part of the perimeter of the deck, the deck and the side wall enclosing a cutting space under the deck,
a front wheel set and a rear wheel set located at the front and the rear of the deck respectively,
a motor attached to the outside top of the platform of the deck, having a drive shaft extending downwards through the deck, the lower part of the drive shaft located substantially at the centre of the cutting space,
at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane,
the lawnmower further having a rear flap, connected to and pivoting from the top rear edge of the deck to allow a grass catcher to be attached in use, the rear flap resting on (and in the most preferred embodiment acting as a lid for the partly open top of) an attached grass catcher, the rear flap having a sub-flap which can open independent of the remainder of the flap, the mower further fitted with a safety clip, adapted so that the sub-flap cannot be raised any higher than the main body of the flap when the flap and sub-flap are positioned for attachment of a grass catcher.

48. A lawnmower according to clause 47 wherein the mower further has at least one skirt, connected to the side wall on one side of the mower between the front wheel set and the rear wheel set, and formed so that when connected the main body of the skirt extends below the lower edge of the side wall and there is a gap between the side wall and the main body, the skirt extending between at least part of the space between the front wheel set and the rear wheel set.

49. A lawn mower according to clause 48 wherein the gap between the side wall and the main body of the skirt has at least a horizontal component in at least part of the space between the front wheel set and the rear wheel set.

50. A lawnmower according to clause 48 wherein the gap between the side wall and the main body of the skirt has at least a vertical component in at least part of the space between the front wheel set and the rear wheel set.

51. A lawnmower according to clause 48 wherein the gap between the side wall and the main body of the skirt has a vertical and a horizontal component in at least part of the space between the front wheel set and the rear wheel set.

52. A lawn mower according to any one of clauses 48 to 51 wherein the skirt extends the whole length of the side wall between the front wheel set and the rear wheel set.

53. A lawn mower according to any one of clauses 48 to 51 wherein the main body of the skirt runs substantially horizontally when the skirt is attached to the mower.

54. A lawn mower according to any one of clauses 48 to 51 wherein the skirt has at least one and preferably three attachment sprigs extending upwards from the main body of the skirt.

55. A lawn mower according to any one of clauses 48 to 54 wherein the skirt is formed from wire having a substantially round cross-section.

56. A lawn mower according to clauses 55 wherein the wire has a diameter of between 4 and 8 mm.

57. A lawnmower according to any one of clauses 48 to 56 wherein the skirt is formed and attached to the side wall such that the gap between the skirt and the ground is insufficient to allow the passage of a standard finger test probe.

58. A lawnmower according to any one of clauses 48 to 57 wherein a guard strip is connected to the side wall on the outside of the side wall of the mower.

59. A lawnmower according to clause 58 wherein the guard strip is formed from plastic or rubber.

60. A lawnmower according to any one of clauses 47 to 59 wherein the mower is fitted with a chipper tube having an upper end and a lower end, the lower end opening into the cutting space above and within the perimeter of the cutting disc formed by rotation of the at least one chipper blade in use, the chipper tube having an integral lid which is normally closed when the mower is operating, the lid fitted with a cut-off mechanism so that if the lid is opened when the ride height or cutting height of the mower has been adjusted to any position except the lowest position, the cut-off mechanism will stop the mower engine.

61. A lawnmower according to clause 60 wherein the cut-off mechanism is a wire connected between the chipper tube lid and the mower engine, the lawnmower, chipper tube lid, and cut-off wire all dimensioned and adjusted so that the lawnmower engine will run without interruption when the lid is closed, but the wire will be pulled beyond the engine cut-off point and stop the engine when the lid is opened and also when the mower is adjusted to any point except the lowest ride height or cutting height.

62. A lawnmower according to clause 61 wherein the lawnmower is fitted with a pair of microswitches, the first microswitch connected to the lid of the chipper tube, and adapted to open and thus stop the lawnmower engine from running when the lid is opened, and a second microswitch located on the lawnmower such that only when the switch is closed (at the lowest ride height or cutting height) can the lid be opened to enable the chipper function.

63. A lawnmower according to any one of clauses 47 to 59 wherein the mower is fitted with a chipper tube having an upper end and a lower end, the lower end opening into the cutting space above and within the perimeter of the cutting disc formed by rotation of the at least one chipper blade in use, wherein the mower is fitted with a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

64. A lawnmower according to clause 63 wherein the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

65. A lawn mower with an integral chipper or shredder, comprising:
a deck, forming a platform and having an exit aperture at the rear of the deck,
a side wall arranged around at least part of the perimeter of the deck, the deck and the side wall enclosing a cutting space under the deck,
a front wheel set and a rear wheel set located at the front and the rear of the deck respectively,
a motor attached to the outside top of the platform of the deck, having a drive shaft extending downwards through the deck, the lower part of the drive shaft located substantially at the centre of the cutting space,
at least one grass cutting blade or blades, and at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane,
a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

66. A lawnmower according to clause 65 wherein the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

67. A lawnmower according to clause 65 or 66 wherein the lawnmower further has a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

68. A lawnmower according to clause 67 wherein the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

69. A lawnmower according to clause 68 wherein the location of the connection points and the dimensions of the wire are chosen so that the spring is only just in tension when the flap and sub-flap are raised into the same or a similar position to that which they would be in with a grass catcher attached.

70. A lawnmower according to clause 68 or clause 69 wherein at least the first end of the wire is formed as an eyebolt.

71. A lawnmower according to any one of clauses 68 to 70 wherein the wire is formed so that that part of the wire formed as a spring can move and pivot freely relative to the remainder of the wire when not in tension.

72. A lawnmower according to any one of clauses 68 to 71 wherein that part of the wire formed as a spring is uppermost when the grass catcher is connected.

73. A lawnmower according to any one of clauses 65 to 72 wherein the lawnmower further has at least one skirt, connected to the side wall on one side of the mower between the front wheel set and the rear wheel set, and formed so that when connected the main body of the skirt extends below the lower edge of the side wall and there is a gap between the side wall and the main body, the skirt extending between at least part of the space between the front wheel set and the rear wheel set.

74. A lawn mower according to clause 73 wherein the gap between the side wall and the main body of the skirt has at least a horizontal component in at least part of the space between the front wheel set and the rear wheel set.

75. A lawnmower according to clause 73 wherein the gap between the side wall and the main body of the skirt has at least a vertical component in at least part of the space between the front wheel set and the rear wheel set.

76. A lawnmower according to clause 73 wherein the gap between the side wall and the main body of the skirt has a vertical and a horizontal component in at least part of the space between the front wheel set and the rear wheel set.

77. A lawn mower according to any one of clauses 73 to 76 wherein the skirt extends the whole length of the side wall between the front wheel set and the rear wheel set.

78. A lawn mower according to any one of clauses 73 to 77 wherein the main body of the skirt runs substantially horizontally when the skirt is attached to the mower.

79. A lawn mower according to any one of clauses 73 to 78 wherein the skirt has at least one and preferably three attachment sprigs extending upwards from the main body of the skirt.

80. A lawn mower according to any one of clauses 73 to 79 wherein the skirt is formed from wire having a substantially round cross-section.

81. A lawn mower according to clause 80 wherein the wire has a diameter of between 4 and 8 mm.

82. A lawnmower according to any one of clauses 73 to 81 wherein the skirt is formed and attached to the side wall such that the gap between the skirt and the ground is insufficient to allow the passage of a standard finger test probe.

83. A lawnmower according to any one of clauses 73 to 82 wherein a guard strip is connected to the side wall on the outside of the side wall of the mower.

84. A lawnmower according to clause 83 wherein the guard strip is formed from plastic or rubber.

85. A lawn mower, comprising:
   a deck, forming a platform and having an exit aperture at the rear of the deck,
   a side wall arranged around at least part of the perimeter of the deck, the deck and the side wall enclosing a cutting space under the deck,
   a front wheel set and a rear wheel set located at the front and the rear of the deck respectively,
   a motor attached to the outside top of the platform of the deck, having a drive shaft extending downwards through the deck, the lower part of the drive shaft located substantially at the centre of the cutting space,
   at least one grass cutting blade or blades, connected to the drive shaft within the cutting space so that the drive shaft causes the at least one grass cutting blade to rotate in a substantially horizontal grass cutting plane,
   a rear flap, connected to and pivoting from the top rear edge of the deck to allow a grass catcher to be attached in use, the rear flap resting on (and in the most preferred embodiment acting as a lid for the partly open top of) a detachable grass catcher when a grass catcher is attached, the rear flap facing downwards to close the exit aperture at the rear of the deck when a grass catcher is not attached, the rear flap having a sub-flap which can open and close independently of the main flap, the mower further fitted with a biasing mechanism that is adapted to bias the flap and sub-flap towards a closed position at least when a grass catcher is attached to the mower.

86. A lawnmower according to clause 85 wherein the biasing mechanism is a wire, at least part of the body of the wire formed as a spring, the first end of the wire connected to the mower body, the second end connected to the sub flap, the connection points and the dimensions of the wire chosen such that when the flap and sub-flap are raised into a position the same as or similar to the position that the flap and sub-flap would be in with a grass catcher attached, the wire and in particular the spring portion of the wire will be in tension.

87. A lawnmower according to clause 86 wherein the location of the connection points and the dimensions of the wire are chosen so that the spring is only just in tension when the flap and sub-flap are raised into the same or a similar position to that which they would be in with a grass catcher attached.

88. A lawnmower according to clause 86 or clause 87 wherein at least the first end of the wire is formed as an eyebolt.

89. A lawnmower according to any one of clauses 86 to 88 wherein the wire is formed so that that part of the wire formed as a spring can move and pivot freely relative to the remainder of the wire when not in tension.

90. A lawnmower according to any one of clauses 86 to 89 wherein that part of the wire formed as a spring is uppermost when the grass catcher is connected.

91. A lawnmower according to any one of clauses 85 to 89 wherein the lawnmower also has at least one chipper or shredder blade or blades connected to the drive shaft within the cutting space so that the drive shaft causes the at least one grass cutting blade to rotate in a substantially horizontal grass cutting plane and the at least one chipper blade to rotate in a substantially horizontal chipping plane, and
   a chipper tube having an upper end and a lower end, the lower end opening into the cutting space above and within the perimeter of the cutting disc formed by rotation of the at least one chipper blade in use, the chipper tube having an integral spring-loaded lid which is biased towards the closed position, the lid fitted with a catch which operates when the mower is set to the lowest ride or cut height to hold the lid in a fully open position, the mower fitted with a safety mechanism so that if the ride height is adjusted away from the lowest setting, the catch will disengage and the spring will bias the lid towards the closed position.

92. A lawnmower according to clause 91 wherein the safety mechanism is a bowden wire connected between the chipper tube lid and the mower body, the lawnmower, chipper tube lid, catch and bowden wire all dimensioned and adjusted so that when the mower is in the lowest ride or cut height position, the catch can engage the lid to hold the lid open, and if the mower is adjusted away from the lowest ride or cut height position, the bowden wire will be pulled or tensioned beyond a cut-off point to disengage the catch and the spring will bias the lid towards the closed position.

93. A lawnmower according to any one of clauses 85 to 92 wherein the lawnmower further has at least one skirt, connected to the side wall on one side of the mower between the front wheel set and the rear wheel set, and formed so that when connected the main body of the skirt extends below the lower edge of the side wall and there is a gap between the side wall and the main body, the skirt extending between at least part of the space between the front wheel set and the rear wheel set.

94. A lawn mower according to clause 93 wherein the gap between the side wall and the main body of the skirt has at least a horizontal component in at least part of the space between the front wheel set and the rear wheel set.

95. A lawnmower according to clause 93 wherein the gap between the side wall and the main body of the skirt has at least a vertical component in at least part of the space between the front wheel set and the rear wheel set.

96. A lawnmower according to clause 93 wherein the gap between the side wall and the main body of the skirt has a vertical and a horizontal component in at least part of the space between the front wheel set and the rear wheel set.

97. A lawn mower according to any one of clauses 93 to 96 wherein the skirt extends the whole length of the side wall between the front wheel set and the rear wheel set.

98. A lawn mower according to any one of clauses 93 to 97 wherein the main body of the skirt runs substantially horizontally when the skirt is attached to the mower.

99. A lawn mower according to any one of clauses 93 to 97 wherein the skirt has at least one and preferably three attachment sprigs extending upwards from the main body of the skirt.

100. A lawn mower according to any one of clauses 93 to 97 wherein the skirt is formed from wire having a substantially round cross-section.

101. A lawn mower according to clause 100 wherein the wire has a diameter of between 4 and 8 mm 102. A lawnmower according to in any one of clauses 93 to 101 wherein the skirt is formed and attached to the side wall such that the gap between the skirt and the ground is insufficient to allow the passage of a standard finger test probe.

103. A lawnmower according to any one of clauses 93 to 102 wherein a guard strip is connected to the side wall on the outside of the side wall of the mower.

104. A lawnmower according to clause 103 wherein the guard strip is formed from plastic or rubber.

The invention claimed is:

1. A lawn mower, comprising:
   a deck, forming a platform and having an exit aperture at a rear of the deck,
   a side wall arranged around at least part of a perimeter of the deck, the deck and the side wall enclosing a cutting space under the deck,
   a front wheel set and a rear wheel set located at a front and the rear of the deck respectively,
   a motor attached to an outside top of the platform of the deck, having a drive shaft extending downwards through the deck, a lower part of the drive shaft located substantially at a centre of the cutting space,
   at least one grass cutting blade, connected to the drive shaft within the cutting space so that the drive shaft causes the at least one grass cutting blade to rotate in a substantially horizontal grass cutting plane,
   a detachable grass catcher receiving grass cuttings from the exit aperture,
   a rear flap, connected to and pivoting from a top rear edge of the deck to allow the detachable grass catcher to be attached in use, the rear flap:
   (i) resting on and acting as a lid for a partly open top of the detachable grass catcher when the grass catcher is attached, and
   (ii) facing downwards to close the exit aperture at the rear of the deck when the grass catcher is not attached,
   the rear flap having a sub-flap which can open and close independently of the rear flap, the mower further fitted with a biasing mechanism that is adapted to bias the rear flap and sub-flap towards a closed position, at least when the grass catcher is attached to the mower.

2. The lawnmower as claimed in claim 1 wherein the biasing mechanism includes a wire, and a spring, a first end of the wire connected to the mower, a second end connected to the sub flap, the first end and second end connection points and the dimensions of the wire chosen such that when the flap and sub-flap are raised into a position that the flap and sub-flap would be in with the grass catcher attached, the wire and the spring portion of the wire is in tension.

3. The lawmnower as claimed in claim 2 wherein the location of the first end and second end connection points and the dimensions of the wire are chosen so that the spring is only just in tension when the flap and sub-flap are raised into the position to that the flap and sub-flap would be in with the grass catcher attached.

4. The lawnmower as claimed in claim 2 wherein at least the first end of the wire is formed as an eyelet.

5. The lawnmower as claimed in claim 2 wherein the wire is formed so that that part of the wire is formed as a spring and can move and pivot freely relative to the remainder of the wire when not in tension.

6. The lawnmower as claimed in claim 5 wherein that part of the wire formed as a spring is uppermost when the grass catcher is connected.

7. A lawn mower with an integral chipper or shredder, comprising:
   a deck, forming a platform and having an exit aperture at a rear of the deck,
   a side wall arranged around at least part of a perimeter of the deck, the deck and the side wall enclosing a cutting space under the deck,
   a front wheel set and a rear wheel set located at a front and the rear of the deck respectively,
   a motor attached to an outside top of the platform of the deck, having a drive shaft extending downwards through the deck, a lower part of the drive shaft located substantially at a centre of the cutting space,
   at least one grass cutting blade or blades, and at least one chipper blade, connected to the drive shaft within the cutting space so that the drive shaft causes the at least one grass cutting blade to rotate in a substantially horizontal grass cutting plane and the at least one chipper blade to rotate in a substantially horizontal chipping plane,
   a chipper tube having an upper end and a lower end, the lower end opening into the cutting space above and within a perimeter of a cutting disc formed by rotation of the at least one chipper blade in use, the chipper tube having a lid which is normally closed when the mower is operating, the lid fitted with a cut-off mechanism so that if the lid is opened when the ride height of the mower is above a predetermined threshold ride height, the cut-off mechanism will stop the mower motor.

8. The lawnmower as claimed in claim 7, wherein the predetermined threshold ride height is the lowest ride height setting.

9. The lawnmower as claimed in claim 7, wherein the cut-off mechanism is a wire connected between the chipper tube lid and the mower motor,
   the lawnmower, chipper tube lid, and cut-off wire all dimensioned and adjusted so that the lawnmower motor will run without interruption when the lid is closed, but the wire will be pulled beyond a motor cut-off point and stop the motor when the lid is opened if the mower is adjusted to any point above a predetermined ride height.

10. The lawnmower as claimed in claim 7, wherein the lawnmower is fitted with a pair of microswitches, a first microswitch connected to the lid of the chipper tube, and arranged to be open when the lid is closed,
    a second microswitch located and arranged such that it is open when the mower is below a predetermined threshold ride height,
    such that the lawnmower motor will be stopped from running when the lid is opened, and the mower is above said predetermined threshold ride height.

11. The lawnmower as claimed in claim 10, wherein the motor is stopped by grounding a primary winding of an ignition coil.

12. The lawnmower as claimed in claim 7, wherein the lid is spring-loaded and biased towards a closed position, the lid fitted with a catch which operates when the mower is set to a ride height below said predetermined threshold ride height to hold the lid in a fully open position, the mower fitted with a safety mechanism so that if the ride height is adjusted above said predetermined threshold ride height, the catch will disengage and the spring will bias the lid towards the closed position.

13. The lawnmower as claimed in claim 12 wherein the safety mechanism is a bowden wire connected between the chipper tube lid and the lawnmower, the lawnmower, chipper tube lid, catch and bowden wire all dimensioned and adjusted so that when the mower is below said predetermined threshold ride height position, the catch can engage the lid to hold the lid open, and if the mower is adjusted above said predetermined threshold ride height position, the bowden wire will be pulled beyond a cut-off point to disengage the catch and the spring will bias the lid towards the closed position.

14. The lawnmower as claimed in claim 7, wherein the lawnmower further has a rear flap, connected to and pivoting from a top rear edge of the deck to allow the detachable grass catcher to be attached in use, the rear flap:
(i) resting on and acting as a lid for a partly open top of the detachable grass catcher when the grass catcher is attached, and
(ii) facing downwards to close the exit aperture at the rear of the deck when the grass catcher is not attached,
the rear flap having a sub-flap which can open and close independently of the rear flap, the mower further fitted with a safety clip, adapted so that at least the sub-flap cannot be raised any higher than a normal operating position that the flap and sub-flap would be in when a grass catcher were attached.

15. The lawnmower as claimed in claim 7 wherein the lawnmower further has a rear flap, connected to and pivoting from a top rear edge of the deck to allow the detachable grass catcher to be attached in use, the rear flap:
(i) resting on and acting as a lid for a partly open top of the detachable grass catcher when the grass catcher is attached, and
(ii) facing downwards to close the exit aperture at the rear of the deck when the grass catcher is not attached,
the rear flap having a sub-flap which can open and close independently of the rear flap, the mower further fitted with a biasing mechanism that is adapted to bias the flap and sub-flap towards a closed position at least when a grass catcher is attached to the mower.

16. The lawnmower as claimed in claim 15 wherein the biasing mechanism includes a wire, and a spring, a first end of the wire connected to the mower, a second end connected to the sub flap, the first end and second end connection points and the dimensions of the wire chosen such that when the flap and sub-flap are raised into a position that the flap and sub-flap would be in with the grass catcher attached, the wire and in particular the spring portion of the wire is in tension.

17. The lawnmower as claimed in claim 16 wherein the location of the first end and second end connection points and the dimensions of the wire are chosen so that the spring is only just in tension when the flap and sub-flap are raised into the position that the flap and sub-flap would be in with the grass catcher attached.

18. The lawnmower as claimed in claim 17 wherein at least the first end of the wire is formed as an eyelet.

19. The lawnmower as claimed in claim 16 wherein the wire is formed so that that part of the wire is formed as a spring and can move and pivot freely relative to the remainder of the wire when not in tension.

20. The lawnmower as claimed in claim 16 wherein that part of the wire formed as a spring is uppermost when the grass catcher is connected.

* * * * *